United States Patent [19]

Kimura et al.

[11] Patent Number: 5,414,905
[45] Date of Patent: May 16, 1995

[54] HOSE CLIP

[75] Inventors: Akira Kimura; Mineo Muto; Kanemitsu Asano; Susumu Nakano; Koji Nakahama, all of Aichi, Japan

[73] Assignee: Togo Seisakusho Corporation, Aichi, Japan

[21] Appl. No.: 44,774

[22] Filed: Apr. 12, 1993

[30] Foreign Application Priority Data

| Apr. 13, 1992 | [JP] | Japan | 4-031345 U |
| Apr. 20, 1992 | [JP] | Japan | 4-038658 U |
| May 15, 1992 | [JP] | Japan | 4-039122 U |
| Dec. 16, 1992 | [JP] | Japan | 4-091682 U |
| Mar. 12, 1993 | [JP] | Japan | 5-016925 U |

[51] Int. Cl.$^6$ .................................. B65D 63/10
[52] U.S. Cl. ........................ 24/20 R; 24/20 TT; 24/205
[58] Field of Search ........... 24/20 R, 20 EE, 20 TT, 24/20 S, 20 CW

[56] References Cited

U.S. PATENT DOCUMENTS

| 973,532 | 10/1910 | McLaughlin | 24/20 TT |
| 3,602,953 | 9/1971 | Thomas | 24/20 TT |
| 4,773,129 | 9/1988 | Muhr | 24/20 EE |
| 4,858,279 | 8/1989 | Kato et al. | 24/20 S |
| 4,930,191 | 6/1990 | Takahashi et al. | 24/20 CW |
| 4,930,192 | 6/1990 | Muhr | 24/20 EE |
| 4,996,749 | 3/1991 | Takahashi | 24/20 CW |
| 5,185,907 | 2/1993 | Kawashima et al. | 24/20 R |
| 5,203,809 | 4/1993 | Oetiker | 24/20 CW |

FOREIGN PATENT DOCUMENTS

| 2470276 | 6/1981 | France | 24/20 R |

Primary Examiner—Richard A. Bertsch
Assistant Examiner—Roland G. McAndrews, Jr.
Attorney, Agent, or Firm—Wenderoth, Lind & Ponack

[57] ABSTRACT

A holderless hose clip, primarily for use in preventing piping hoses from falling off of connecting pipes in automotive vehicles, includes a clip body formed of a leaf spring having the shape of an annular band and which clamps the hose when released from a spread-diameter state to assume a free state. A pair of grip strips are formed by bending the ends of the clip body, respectively. An engagement claw and an engagement recess are formed on the respective grip strips to secure the grip strips to each other when the grip strips are gripped, so that the clip body is held in the spread-diameter state. The engagement claw has a guide face for guiding the grip strips axially of the clip body when the grip strips are gripped whereupon the engagement claw is received in the recess. In an alternative form of the hose clip, an opening is formed between the grip strips and a tool can be inserted into the opening while the hose clip is in the spread-diameter state to move the grip strips radially of the clip body and thereby release the clip body from the spread-diameter state.

9 Claims, 19 Drawing Sheets

HOSE CLIP

BACKGROUND OF THE INVENTION

1. Field of the Invention

This invention relates to hose clips primarily preventing various piping hoses connected to connecting pipes in automotive vehicles, for example, and more particularly to such a hose clip adapted to be inherently capable of holding its spread-diameter state without use of a separate holder.

2. Description of the Prior Art

Various hoses are generally used in an engine compartment of an automotive vehicle for cooling the engine and supplying fuel to the engine. These hoses include those intended for use with a high pressurized fluid, which need to be prevented from falling off from connecting pipes. A generally ring-shaped metal hose clip is conventionally used so that the hose is reliably clamped by its inherent strong spring force. It is desirable that the hose clip be conveyed to a work place in the state that its diameter is previously spread in consideration of working efficiency there. This state of the hose clip will be referred to as "spread-diameter state."

The following methods are known for holding the hose clip in its spread-diameter state. First, the hose clip is generally formed by bending a spring band plate into the shape of a ring. Grip strips are formed on both ends of the band plate for spreading its diameter. The grip strips are caused to come close to each other in the spread-diameter state of the hose clip and then, the grip strips are strode by a generally U-shaped member or holder such that the hose clip is held in the spread-diameter state.

However, the holder needs to be pulled out before the hose is clamped by the above-described hose clip. The holders, after pulled out of the hose clips, are thrown away around the work place. The used holders are thus scattered about, which worsens the working environment. Furthermore, the hose clip cannot be again held in the spread-diameter state without the holder when it is required to be held in the spread-diameter state after the hose has been clamped by the hose clip.

In view of the foregoing, the prior art has recently proposed so-called "holderless" type hose clips which can be held in the spread-diameter without using the holder. For example, U.S. Pat. No. 4,773,129 to Rudolf Muhr discloses a hose clamp comprising a ring-shaped clamping body having one end rising radially outwardly and further, bent approximately perpendicularly, in which end a locking recess is formed. The other end of the clamping body is bent radially outwardly and a locking projection is formed in the end. The locking projection is inserted into the locking recess such that the clamping body is held in the spread-diameter state. In order that the hose clamp is released from the spread-diameter state, the locking projection is pushed down by the distal end of a tool such as a screwdriver so that the locking projection is disengaged from the locking recess.

In the above-described releasing operation, however, the distal end of the screwdriver is likely to slip and accordingly, the whole hose clamp becomes unstable. Accordingly, a stable releasing operation cannot be expected. In such an unstable releasing operation, an excessive force tends to be applied to the locking projection in the manipulation so that it is pushed down, which plastically deforms the clamping body radially. Consequently, circularity of the hose clamp is deviated, which results in drop and nonuniformity in clamping pressure of the clamping body. Japanese Published Utility Model Registration Application No. 64-29591 is directed to the same subject mater as in the above-described U.S. Pat. No. 4,773,129.

Japanese Published Utility Model Registration Application No. 3-86277 discloses another technique of the holderless type hose clip. The disclosed hose clip comprises a clip body having at one end a rising bridge portion and at the other end a rising manipulation end and a rising engagement claw. The engagement claw is engaged with the bridge portion such that the hose clip is held in the spread-diameter state. When the hose clip is turned from the free or clamping state to the spread-diameter state, the manipulation necessitates both gripping circumferentially of the hose clip and an axial displacement. The directions of both manipulations intersect to each other and accordingly, the manipulations are quite difficult. Furthermore, the disclosed hose clip is directed to one having a relatively small spring force and is subjected to manual operation. Accordingly, this hose clip can be used even when the directions of the manipulations intersect to each other. However, a special tool is required for the manipulation when the hose clip has a relatively large spring force. Such a special tool has a complicate construction and is difficult to be manufactured. Furthermore, the construction of the hose clip itself is also rendered complicate.

SUMMARY OF THE INVENTION

Therefore, an object of the present invention is to provide a hose clip which can be readily released from the spread-diameter state and can be prevented from being plastically deformed during the releasing operation for the clip body.

Another object of the invention is to provide a hose clip which can be readily manipulated from the free state to the spread-diameter state and has a simple construction.

To achieve the objects, the present invention provides a hose clip comprising a clip body formed by annularly bending a band leaf spring, the clip body having two ends, a pair of grip strips formed by bending the ends of the clip body respectively for manipulation of the clip body into a spread-diameter state, engagement means provided on the respective grip strips to be engaged with each other when the grip strips are gripped, thereby holding the clip body in the spread-diameter state, and guide means provided on at least one of the engagement means for guiding engagement of the engagement means so that the grip strips are moved relative to the clip body axially of the clip body when the grip strips are gripped.

According to the above-described construction, the engagement means are disengaged from each other such that the clip body can be turned from the spread-diameter state to the reduced-diameter state when the grip strips are moved in the opposite directions axially of the hose clip respectively. In this case, since the grip strips are not deformed axially of the clip body, the circularity of the clip body and accordingly, uniform clamping force against the hose or the like can be maintained. On the other hand, when the grip strips are gripped so that the clip body is turned into the spread-diameter state, the engagement of the engagement means is guided by the guide means. Thus, the invention can provide a hose clip easy in operation. Additionally, the construction of the hose clip can be simplified since only the engagement means and the guide means are provided on the grip strips.

Other objects of the present invention will become obvious upon understanding of the preferred embodiments about to be described. Various advantages not referred to herein will occur to those skilled in the art upon employment of the invention in practice.

BRIEF DESCRIPTION OF THE DRAWINGS

The embodiments of the present invention will be described with reference to the accompanying drawings, in which.

DESCRIPTION OF THE PREFERRED EMBODIMENTS

First Embodiment

Figure 1:
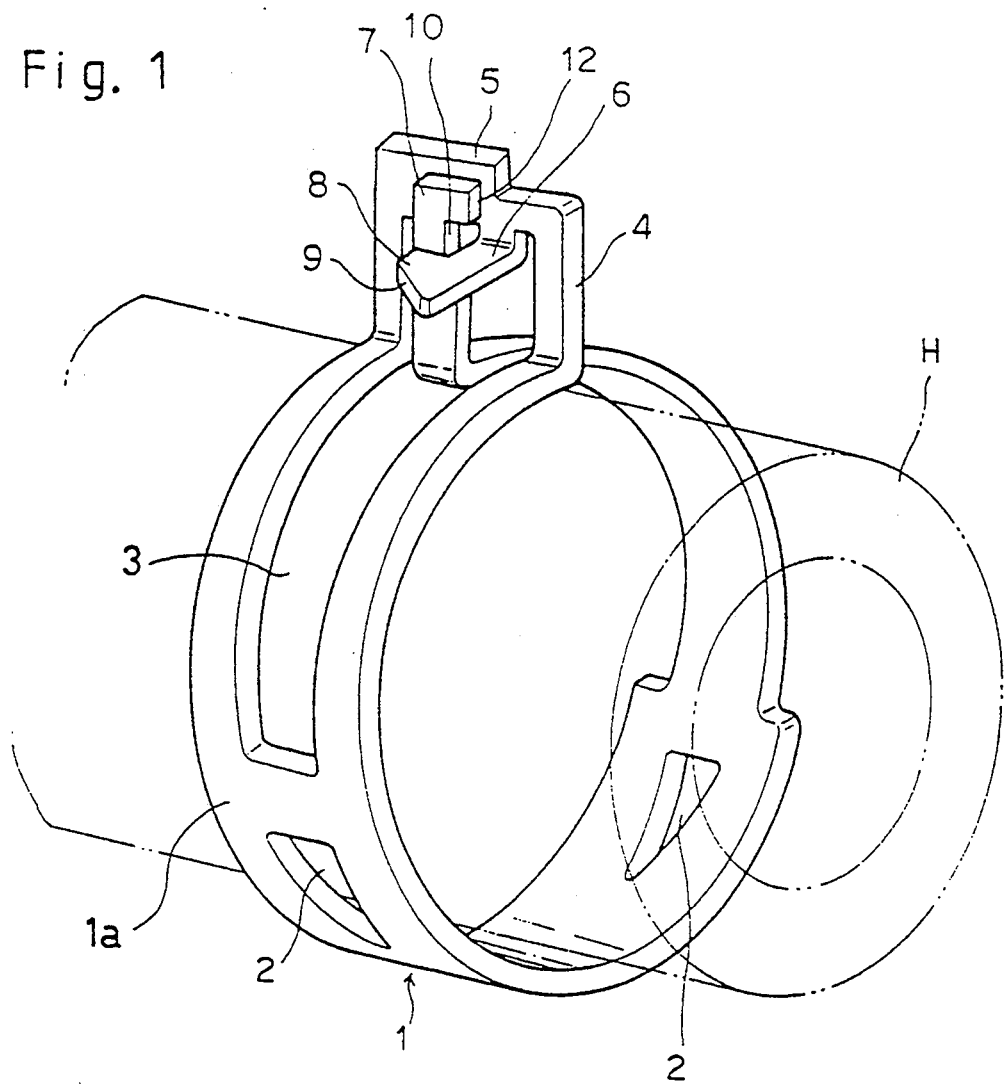
FIG. 1 is a perspective view of the hose clip of a first embodiment in accordance with the present invention.

FIGS. 1 through 5 illustrate the hose clip of a first embodiment in accordance with the present invention. The hose clip 1 comprises a clip body 1a formed by annularly bending a band leaf spring. Two triangular holes 2 are formed in the circumferential face of the clip body 1a so that a uniform clamping force is applied over the whole circumference of a hose H when it is clamped by the hose clip 1. A groove 3 with a predetermined length is open in one end side of the clip body 1a. This end including a part of the groove 3 rises radially outwardly such that an arch-shaped first grip strip 4 is provided. A releasing protrusion 5 is integrally formed at generally one-half of an upper edge of the first grip strip 4. An engagement claw 6 is formed on a distal edge of the first grip strip 4. More specifically, the engagement claw 6 is slightly away from the center of the first grip strip 4 to the right, as viewed in FIGS. 1 and 2. The engagement claw 6 is bent from the distal edge of the first grip strip 4, extending substantially tangentially toward a second grip strip 7 which will be described later. A distal end of the engagement claw 6 projects to one side (to the left in FIG. 3) to thereby serve as a claw portion 8. The distal side edge of the claw portion 8 is gradually inclined rearwardly such that its width is gradually increased, thereby serving as a guide face 9 guiding engagement of the first and second grip strips 4, 7.

Figure 2:
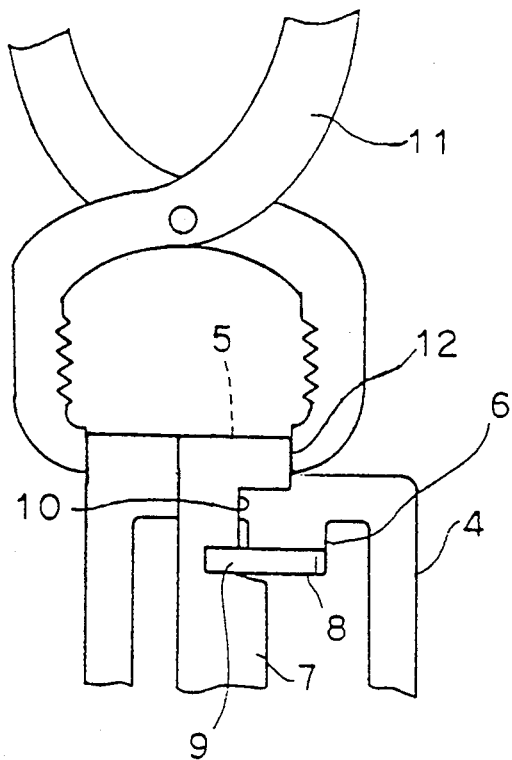
FIG. 2 is a partial side of the hose clip being manipulated for its release from the spread-diameter state.
Figure 3:
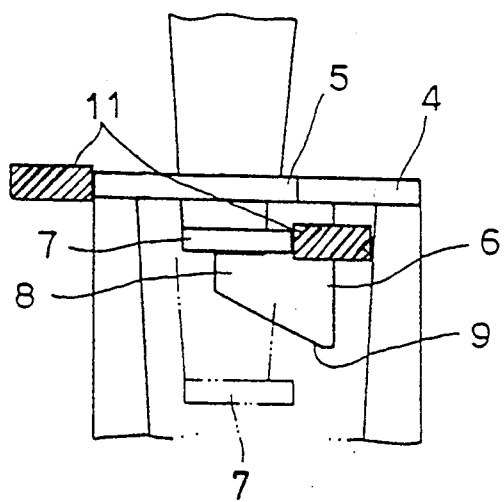
FIG. 3 is a partial sectional plan view of the hose clip being manipulated for its release from the spread-diameter state.

The clip body 1a has at the other end side a tapered or reduced width portion whose length is approximately the same as the opening of the groove 3. A distal end of the tapered portion extends through the first grip strip 4 with predetermined gaps between it and the respective side edges of the groove 3 and at approximately the same curvature as the groove 3. The distal end of the reduced width portion rises axially of the clip body 1a to thereby serve as the second grip strip 7 opposed to the first grip strip 4. A part of side edge of the second grip strip 7 near its upper end and opposite the engagement claw 6 is cut out to serve as an engagement recess 10. As shown in FIG. 2, the upper edge of the second grip strip 7 is substantially planar with the upper edge of the protrusion 5 of the first grip strip 4 when the clip body 1a is held in the spread-diameter state. When the hose clip is released from the spread-diameter state, the side edge (push edge 12) of the protrusion 5 and the side edge of the engagement recess 10 of the second grip strip 7 are gripped by a commercially available tool 11 such as pliers, as shown in FIGS. 2 and 3.

The hose clip constructed as described above is conveyed to a work place in its spread-diameter state. At the work place, the clip body 1a of the hose clip 1 in the spread-diameter state is inserted onto an end of the hose H, which is then fitted into a connection pipe (not shown). One end of the tool 11 is applied to the side edge of the protrusion 5 and the other end of the tool 11 is applied to the push edge 12. These edges are then gripped strong such that the second grip strip 7 is displaced in such a direction as be away from the engagement claw 6 and axially of the clip body 1a. Consequently, the hose clip 1 turns into the reduced-diameter state by its inherent spring force, thereby automatically clamping the hose H.

Figure 4:
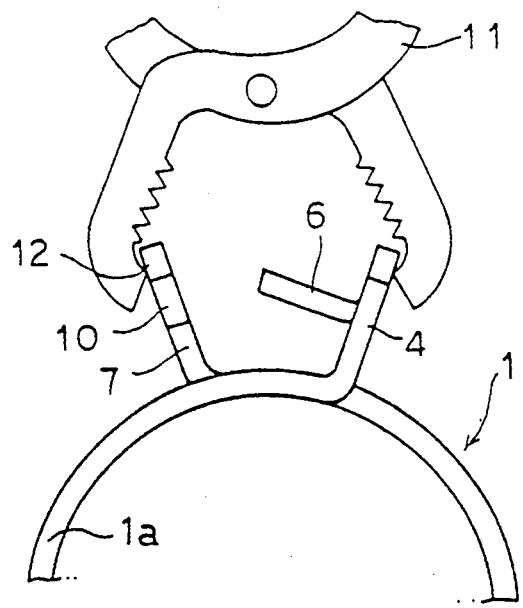
FIG. 4 is a partial front view of the hose clip being manipulated to turn it into the spread-diameter state.
Figure 5:
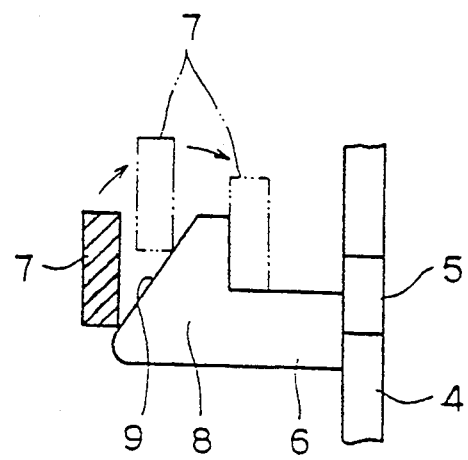
FIG. 5 is a sectional view showing the guiding operation of the guide means.

When the hose H needs to be replaced by a new one, both grip strips 4, 7 are gripped with the tool 11, as shown in FIG. 4. Then, the grip strips 4, 7 come close to each other and the engagement claw 6 is brought into contact with the engagement recess 10. Upon further gripping, the second grip strip 7 is guided along the guide face 9 to retreat axially of the hose clip 1. After having passed the guide face 9, the second grip strip 7 returns by its spring force such that the engagement claw 6 engages the engagement recess 10. Thus, since the clip body 1a is again held in the spread-diameter state, the hose clip 1 can be quickly inserted onto the new hose H.

According to the above-described embodiment, the only manipulation for holding the hose clip 1 in the spread-diameter state is to grip the grip strips 4, 7 with the tool such as the pliers. Accordingly, since the manipulation in a single direction is only required, working efficiency of the repair and replacement of the hose H can be improved. Furthermore, both grip strips 4, 7 are deformed only axially and not accompanied by the radial deformation during the manipulations for its release from and hold in the spread-diameter state. Consequently, the circularity of the clip body 1a can be preserved. The above-described hose clip is advantageous particularly when a sufficient space cannot be ensured around the hose clip in the installation. Furthermore, since the means for holding the hose clip in the spread-diameter state has a simple construction, an improvement of the manufacturing efficiency of the hose clip can be expected. Additionally, since the holding means are formed within the range of the width of the hose clip, the yield of the hose clip can be improved and accordingly, the hose clip is advantageous in economy.

Second Embodiment

Figure 6:
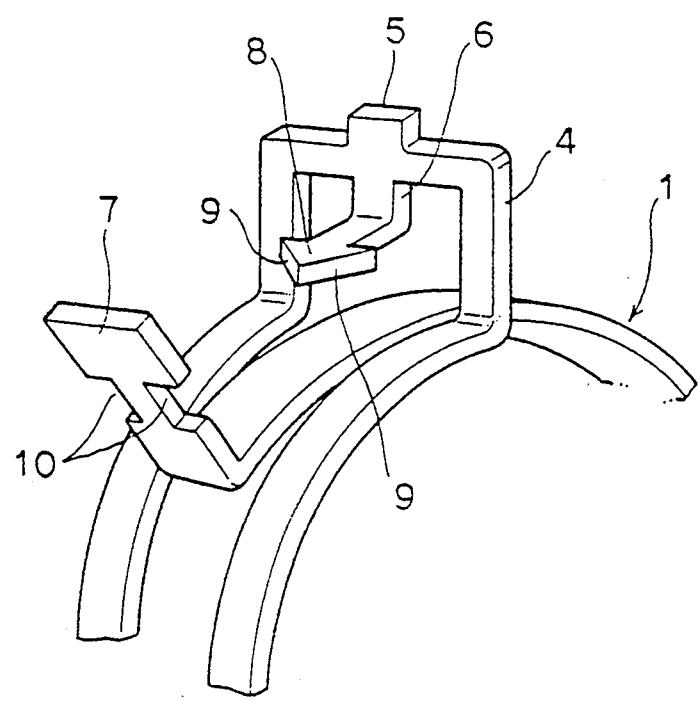
FIG. 6 is a perspective view showing the grip strips of the hose clip of a second embodiment.

FIG. 6 illustrates the hose clip of a second embodiment which is a modified form of the first embodiment. In this embodiment, the engagement recesses 10 are formed in both sides of the second grip strip 7 respectively. The claw portion 8 of the engagement claw 6 is formed into the shape of a symmetrical arrowhead. Consequently, the engagement claw 6 can be engaged with the engagement recess 10 from either side. Since the guide face 9 is also formed symmetrically on the engagement claw 6, the grip 7 can be guided along the guide face 9 from either side thereof. Thus, the manipulation for holding the hose clip 1 in the spread-diameter state can be further simplified. The other construction is the same as in the first embodiment.

Various modifications can be made in the above-described hose clips. For example, although the engagement claw 6 and the engagement recess 10 are provided on the first and second grip strips 4 and 7 respectively in the above-described embodiments, the engagement recess 10 may be formed in the first grip strip 4 with the claw 6 provided on the second grip strip 7. Furthermore, although the releasing protrusion 5 is formed on the one-half of the first grip strip 4 in the foregoing embodiments, it may be provided on the end of the first grip strip 4. Furthermore, the protrusion 5 may take any position if both grip strips can be relatively displaced axially of the hose clip by the gripping with the tool.

Third Embodiment

Figure 7:
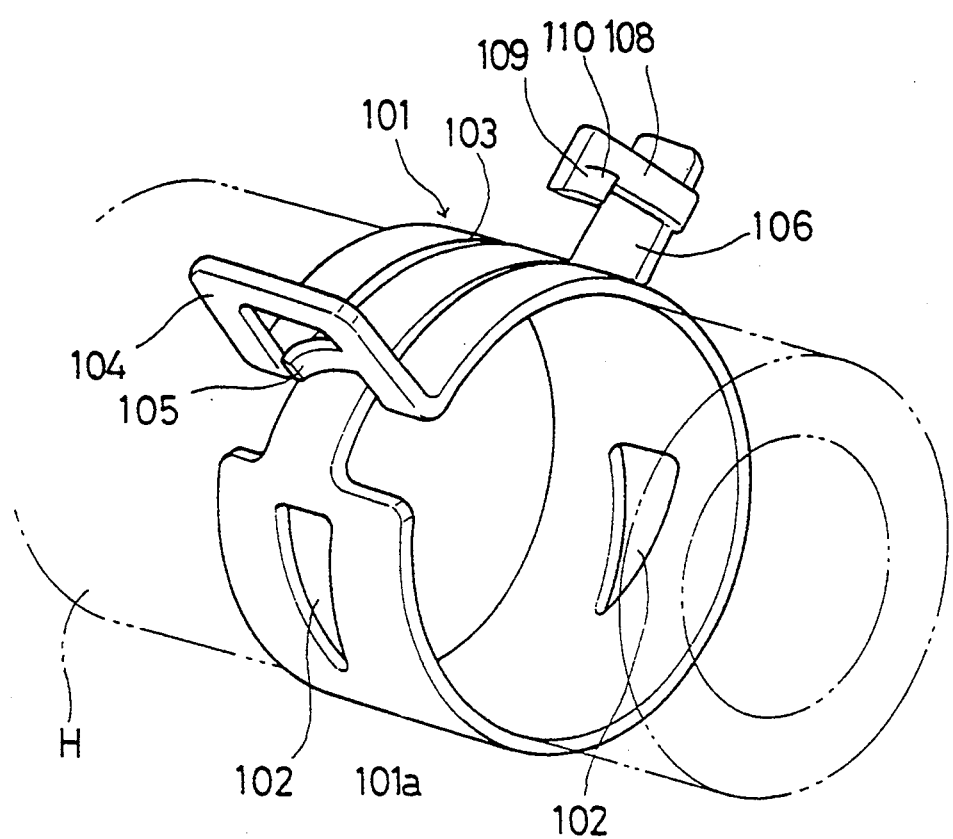
FIG. 7 is a perspective view of the hose clip of a third embodiment.

FIGS. 7–11 illustrate the hose clip of a third embodiment. An overall hose clip 101 clamping the hose H is shown in FIG. 7. The hose clip 101 comprises the clip body 101a formed by annularly bending the band leaf spring. Two triangular holes 102 are formed in the circumferential face of the clip body 101a so that a uniform clamping force is applied over the whole circumference of a hose H when it is clamped by the hose clip 101.

The groove 103 with a predetermined length is open in one end side of the clip body 101a. This end including a part of the groove 103 rises radially outwardly such that an arch-shaped first grip strip 104 is provided. The first grip strip 104 has an engagement strip 105 projecting inwardly and horizontally from one side thereof. The engagement strip 105 is bent into the shape of an arc and has a surface jostling with a provisionally holding claw 109 of the second grip strip 106, which surface serves as the guide face 107.

The clip body 101a has at the other end side a tapered or reduced width portion whose length is approximately the same as the opening of the groove 103. A distal end of the tapered portion extends through the first grip strip 104 with predetermined gaps between it and the respective side edges of the groove 103 and at approximately the same curvature as the groove 103. The distal end of the reduced width portion rises axially of the clip body 101a to thereby serve as the second grip strip 106 which is opposed to the first grip strip 104 at approximately the same height as the first grip strip 104. A protrusion 108 is integrally formed on one side edge of the distal end of the second grip strip 106. The protrusion 108 is extended substantially perpendicularly to the second grip strip 106 toward the first grip strip 104 and then, the lower half of its distal end is cut and raised so that the provisionally holding claw 109 is formed there. This provisionally holding claw 109 has substantially the same width as the engagement strip 105 and has a smooth arc side surface serving as the guide face 110. The guide face 110 is brought into slidable contact with the guide face 107 of the engagement strip 105 when the grip strips 104, 106 are gripped to come close to each other. In this case, the guide faces 110, 107 are pushed to each other such that the grip strips 104, 106 are moved axially of the clip body 101a relative to each other, whereby the engagement strip 105 and the provisionally holding claw 109 can be engaged with each other.

Figure 11:
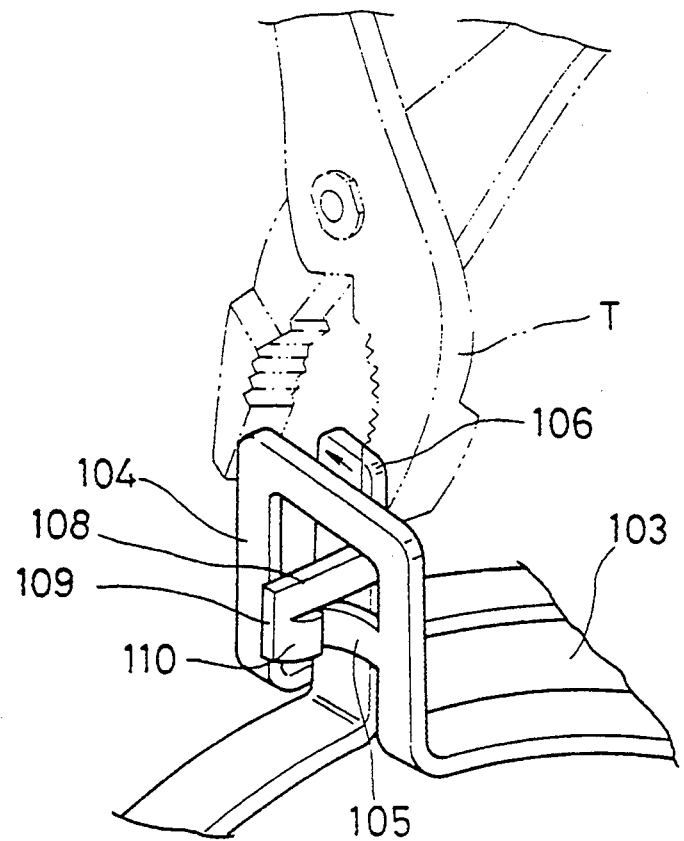
FIG. 11 is a partial perspective view of the hose clip being manipulated for its release from the spread-diameter state.

The hose clip constructed as described above is conveyed to the work place in its spread-diameter state. At the work place, the clip body 101a of the hose clip 101 in the spread-diameter state is inserted onto one end of the hose H, which is then fitted into the connection pipe (not shown). One of jaws of the tool such as the pliers is applied to the side edge of the first grip strip 104 and the other jaw of the pliers is applied to the distal end of the second grip strip 106, as shown in FIG. 11. When the grip strips 104, 106 are then gripped tight, the grip strips 104, 106 are forced to move axially of the clip body 101a such that the provisionally holding claw 109 and the engagement strip 105 are disengaged from each other. Consequently, the hose clip 101 turns into the reduced-diameter state by its inherent spring force, thereby automatically clamping the hose H.

Figure 8:
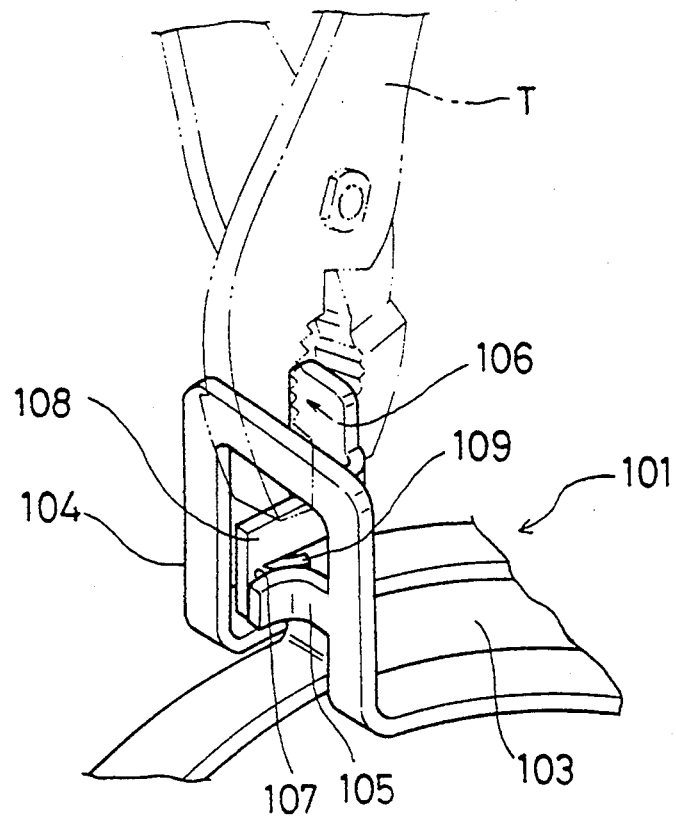
FIG. 8 is a partial perspective view of the hose clip being manipulated for its release from the spread-diameter state.
Figure 9:
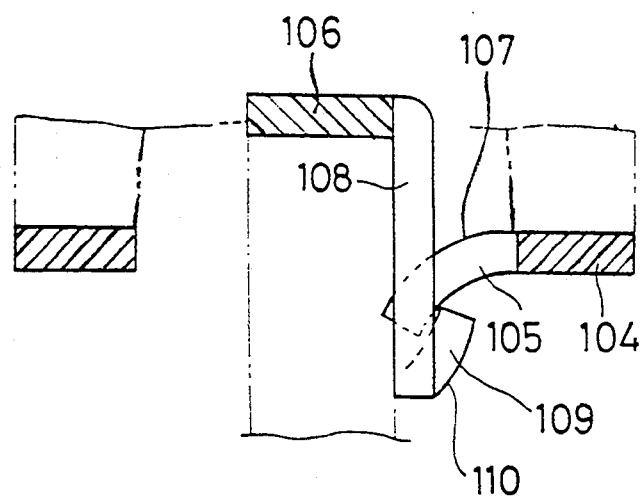
FIG. 9 is a partial sectional plan view of the hose clip in the engaging operation.
Figure 10:
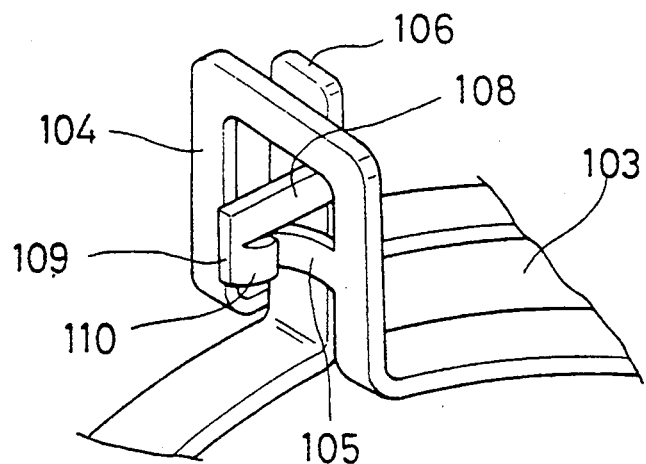
FIG. 10 is a partial perspective view of the hose clip in the engaged state.

When the hose H needs to be replaced by a new one, both grip strips 104, 106 are gripped with the tool T, as shown in FIG. 8. Then, the grip strips 104, 106 are caused to come close to each other and the guide faces 107, 110 of the engagement strip 105 and the provisionally holding claw 109 respectively are brought into slidable contact with each other. In this case, an external force acting on the guide faces 107, 110 displaces the second grip strip 106 in the direction shown by arrow in FIG. 8 or axially of the clip body 101a. The second grip strip 106 returns after the engagement strip 105 has passed the provisionally holding claw 109. Consequently, the engagement strip 105 and the provisionally holding claw 109 are engaged with each other. Thus, since the clip body 101a is again held in the spread-diameter state, the hose clip 101 can be quickly inserted onto the new hose H.

According to the above-described embodiment, the only manipulation for holding the hose clip in the spread-diameter state is to grip the grip strips 104, 106 with the tool such as pliers such that the engagement of the engagement strip 105 and the provisionally holding claw 109 is automatically guided. Accordingly, since the manipulation in a single direction is only required, working efficiency of the repair and replacement of the hose H can be improved. Furthermore, both grip strips 104, 106 are deformed only axially and not accompanied by the radial deformation during the manipulations for its release from and hold in the spread-diameter state. Consequently, the circularity of the clip body 101a can be preserved. The above-described hose clip is advantageous particularly when a sufficient space cannot be ensured around the hose clip in the installation. Furthermore, since the means for provisionally holding the hose clip has a simple construction, an improvement of the manufacturing efficiency of the hose clip can be expected.

Fourth Embodiment

Figure 12:
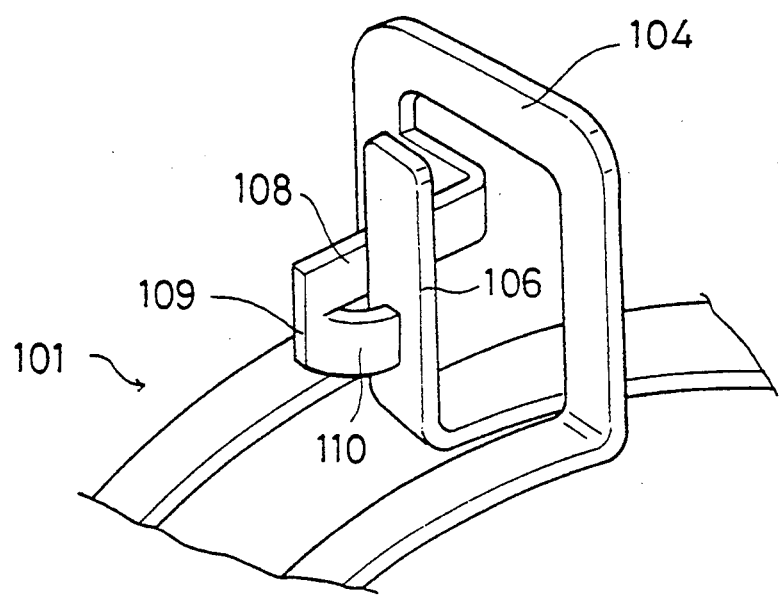
FIG. 12 is a partial perspective view of the hose clip of a fourth embodiment.

FIG. 12 illustrates the hose clip of a fourth embodiment which is a modified form of the third embodiment. In the fourth embodiment, the protrusion 108 is formed on the side of the first grip strip 104 so that the provisionally holding claw 109 is directly engaged with the side edge of the second grip strip 106. In this case, further constructional simplification can be achieved. An engagement strip with a guide face may be provided on the second grip strip 106 for smooth hold of the hose clip in the spread-diameter state and its release from the spread-diameter state.

Fifth Embodiment

Figure 13:
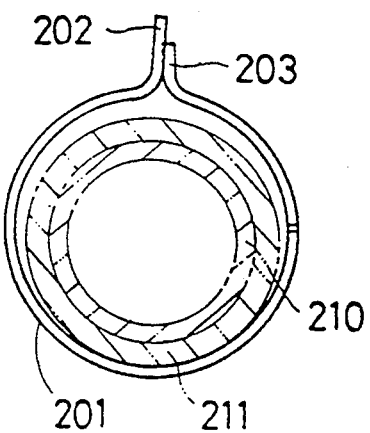
FIG. 13 is a side view of the hose clip of a fifth embodiment in the spread-diameter state.
Figure 14:
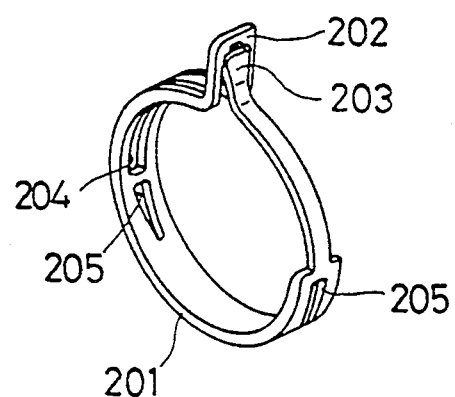
FIG. 14 is a perspective view of the hose clip in the spread-diameter state.

FIG. 13 illustrates the hose clip in the provisionally held state. The hose clip is formed of a band leaf spring with a preselected spring constant and comprises the ring-shaped clip body 201 and a pair of grip strips 202, 203 formed by radially bending both ends of the clip body 201 respectively and adjacent to each other.

The grip 202 is formed into an inverted U-shaped first grip strip and the grip 203 is formed into a single-legged second grip strip. The first and second grip strips 202, 203 are caused to abut against each other upon elastic deformation of the clip body 201 such that the clip body 201 is held in the spread-diameter state. A slit 204 is formed in the clip body end continuous to the first grip strip 202. The slit 204 includes a space between legs of the first grip strip 202. The width of the clip body end continuous to the second grip strip 203 is smaller than the opening width of the slit 204. The distal end of the second grip strip 203 is expanded in the direction of its width.

Figure 21:
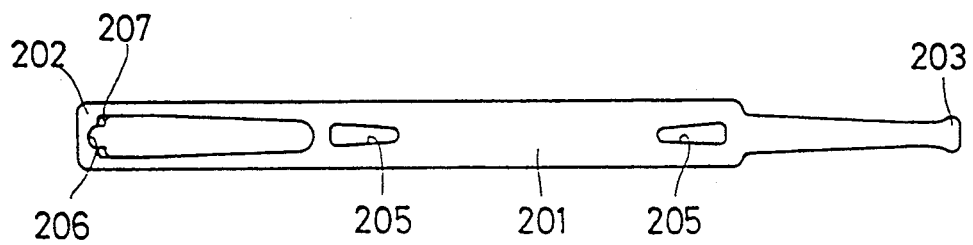
FIG. 21 is a development of the hose clip.

The triangular holes 205 are formed in the central portion of the clip body 201 to be adjacent to the slit 204 and the smaller width portion respectively. FIG. 21 is a development of the above-described hose clip.

Figure 15:
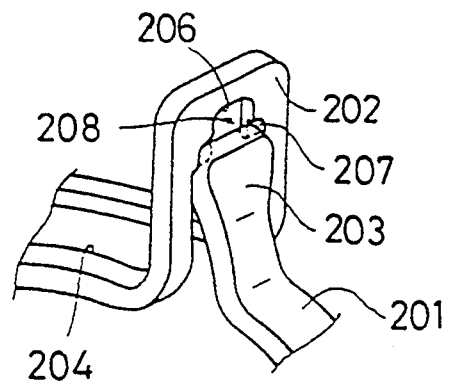
FIG. 15 is a partial enlarged view of the hose clip in the engaged state.
Figure 16:
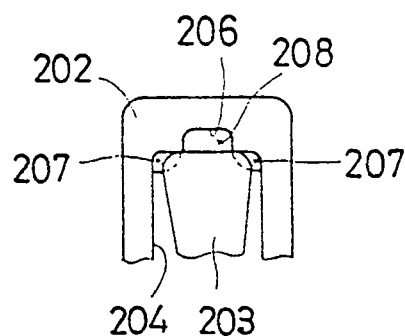
FIG. 16 is a partial front view of the hose clip in the engaged state.
Figure 22:
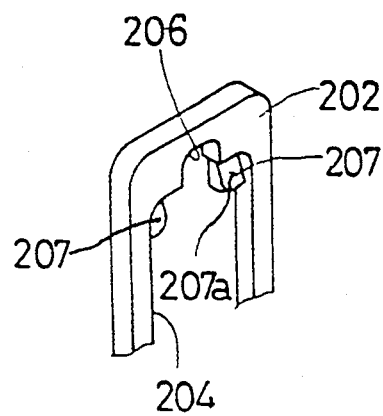
FIG. 22 is a partial enlarged perspective view of the first grip strip of the hose clip.
Figure 23:
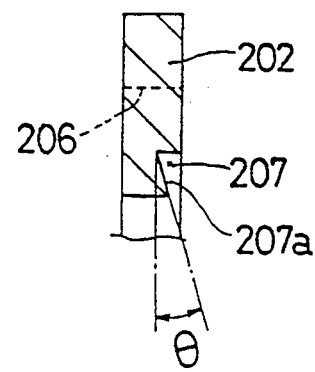
FIG. 23 is a partial sectional view of the first grip strip strip.

Referring now to FIGS. 15 and 16, a notch 206 continuous to the slit 204 is formed in the central bridge portion of the first grip strip 202 by way of punching. A recess 207 is formed in a stepped portion at the open side of the notch 206 by way of molding. The distal expanded portion of the second grip strip 203 is fitted into the recess 207. The first grip strip 202 is shown in FIGS. 22 and 23. Accordingly, an opening 208 is defined by the recessed portion of the notch 206 between the distal edge of the second grip strip 203 and the opposite edge of the bridge portion of the first grip strip 202 opposed to the second grip strip 203 when the clip body 201 is in the spread-diameter state wherein the second grip strip 203 is fitted in the recess 207 of the first grip strip 202.

The recess 207 of the first grip strip 202 has a receiving face 207a formed into an inclined face with such an inclination $\theta$ that it is deepened toward the distal grip end or upwardly in the figures. The second grip strip 203 is bent at an angle of $\theta$ relative to the first grip strip 202 so that the second grip strip 203 properly abuts against the receiving face 207a of the recess 207.

In use, the hose clip in the spread-diameter state is inserted onto the connected portions of the connection pipe 210 and the rubber hose 211, as shown by two-dot chain line in FIG. 13. A screwdriver 212 is used as a jig for releasing the hose clip from the spread-diameter state in the manner as shown by two-dot chain line in FIG. 17. A working portion of the screwdriver 212 or an axial end 212a is inserted into the opening 208 and then, the screwdriver 212 is moved so as to pry the grip strips 202, 203 (see void arrow in FIG. 17), so that the grip strips 202, 203 are pushed in the opposite directions respectively. The releasing jig is not limited to the screwdriver 212 and any bar-shaped member or any lever may be used for that purpose. The hose clip is released from the provisionally held state when the distal end of the second grip strip 203 is disengaged from the recess 207 of the first grip strip 202. In this regard, the hose clip can be released from the spread-diameter state by a small force applied thereto since a support point A of the axial end 212a of the screwdriver 212 is close to its application point B as shown in FIG.

Figure 18:
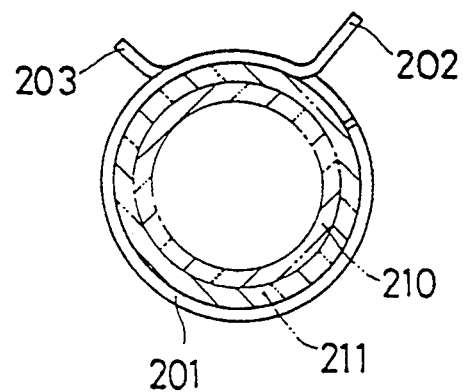
FIG. 18 is a side view of the hose clip in the free or clamping state.
Figure 19:
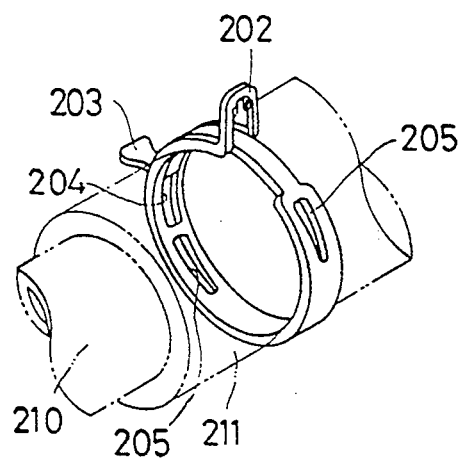
FIG. 19 is a perspective view of the hose clip in the clamping state.
Figure 20:
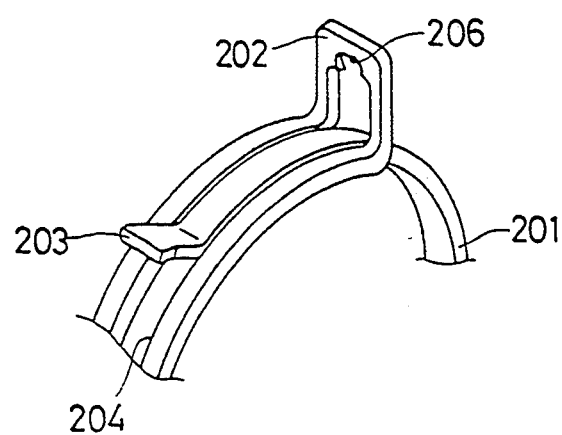
FIG. 20 is a partial perspective view of the hose clip in the free state.

17. Upon release from the provisionally held state, the clip body 201 elastically deforms into the free state, thereby clamping the hose 211 against the connection pipe 210. FIGS. 18–20 illustrate the clamping state of the hose clip.

The side end of the second grip strip 203 moves in the slit 204 during the elastic deformation of the clip body 201. The clip body 201 is released from the spread-diameter state when the grip strips 202, 203 are pushed by the screwdriver 212 in the opposite directions respectively. Accordingly, the force required for the release of the clip body 201 from the spread-diameter state is smaller than that required in the prior art. Furthermore, an excessive force larger than that required for the release is not applied to the clip body 201. Consequently, the clip body 201 can be readily released from the spread-diameter state without suffering abnormal deformation.

Figure 17:
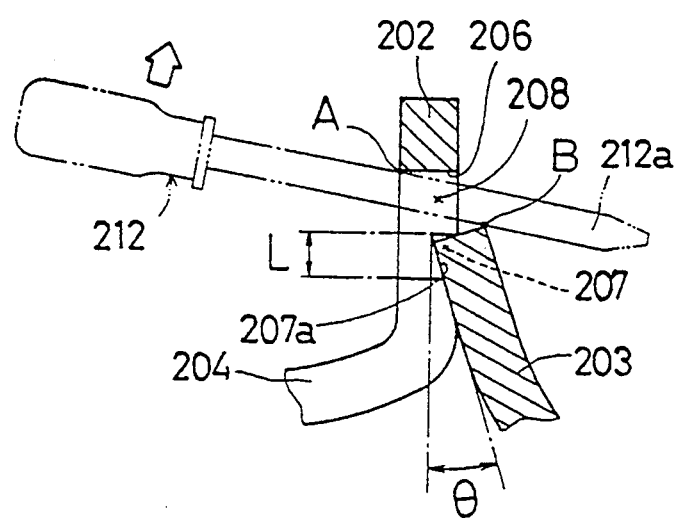
FIG. 17 is a sectional view showing manipulation of the hose clip for its release from the spread-diameter state.

Furthermore, the receiving face 207a of the recess 207 of the first grip strip 202 is inclined. The second grip strip 203 abutting against the receiving face 207a is urged upwardly by the inherent spring force of the hose clip, as shown in FIG. 17. Consequently, the distal edge of the grip 203 butts against the face of the recess 207a such that its position is limited. Thus, the second grip strip 203 can be prevented from moving downward as viewed in FIG. 17. Accordingly, an inadvertent release of the clip body 201 from the spread-diameter state by an external shock can be avoided. This allows an amount of overlap of the grip strips 202, 203 (shown by reference symbol L in FIG. 17) to be set to a small value. Furthermore, an amount of relative movement of the grip strips 202, 203 in the release from the provisionally held state can be reduced, which is effective for prevention of abnormal deformation of the clip body 201. The widthwise movement of the second grip strip 203 can be limited when the distal side edge of the grip 203 abuts against the face of the recess 207.

The grip strips 202, 203 are gripped with the tool such as the pliers so as to come close to each other in order that the clip body 201 is turned from the free state to the spread-diameter state. Then, when the grip strips 202, 203 are moved radially in opposite directions respectively, the distal end of the second grip strip 203 is caused to go under the recess 207 to be engaged therewith.

Figure 24:
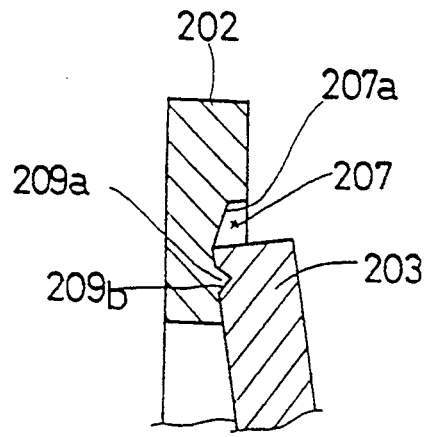
FIG. 24 is a partial sectional view of the hose clip of a sixth embodiment.
Figure 25:
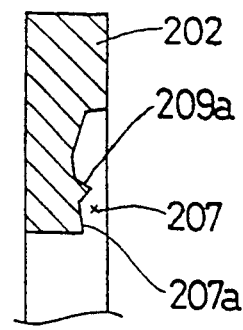
FIG. 25 is a partial sectional view of the first grip strip strip of the hose clip.
Figure 26:
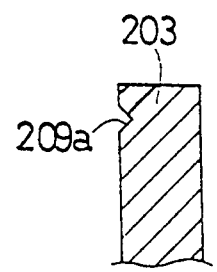
FIG. 26 is a partial sectional view of the second grip strip strip.

Sixth embodiment:

FIGS. 24–26 illustrate the hose clip of a sixth embodiment which is a modified form of the fifth embodiment. In the sixth embodiment, a protrusion 209a with a conical profile is formed on the receiving face 207a of the recess 207 of the first grip strip 202, and the second grip strip 203 has a groove 209b which engages the protrusion 209a. Oppositely, the protrusion 209a may be provided on the second grip strip 203 and the groove 209b may be provided in the receiving face 207a of the recess 207 of the first grip strip 202. In the sixth embodiment, too, an inadvertent release of the clip body 201 from the spread-diameter state.

Figure 27:
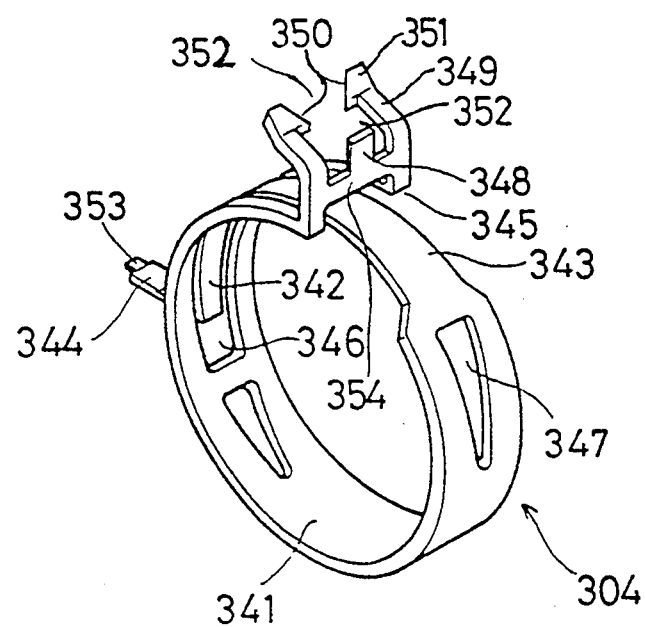
FIG. 27 is a perspective view of the hose clip of a seventh embodiment.
Figure 28:
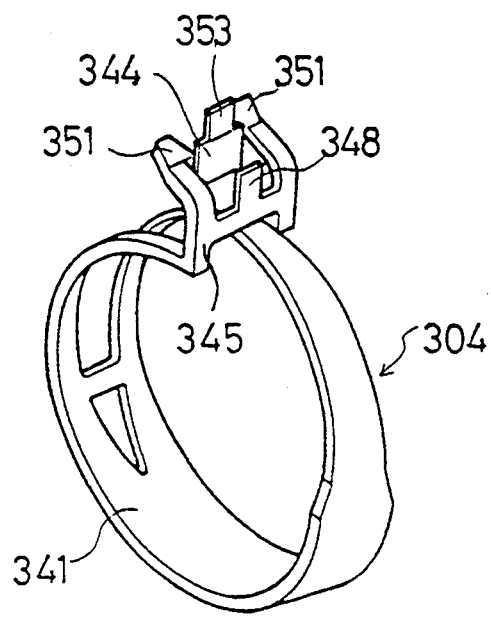
FIG. 28 is a perspective view of the hose clip in the spread-diameter state.
Figure 29:
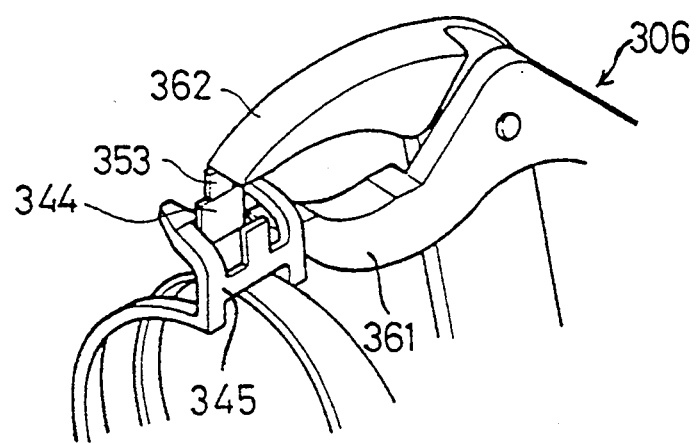
FIG. 29 is a partial perspective view showing the releasing of the hose clip from the spread-diameter state.

Seventh embodiment:

FIGS. 27–29 illustrate the hose clip of a seventh embodiment. The hose clip 304 is formed by pressing a carbon steel band. The hose clip 304 comprises the clip body 341 bent annularly and the grip strips 344, 345 formed by bending both ends of the clip body 341 radially outwardly. As shown in FIG. 27, two triangular holes 347 are formed in the clip body 341 so as to take symmetrical positions. The triangular holes 347 are provided so that a uniform clamping force is applied over the whole circumference of a hose when it is clamped by the hose clip 304.

The width of one end side of the clip body 341 is reduced as it goes to its distal end and then, this end is radially bent to thereby serve as the first grip strip 344. The width of the first grip strip 344 is increased as it goes to the distal end, so that it has an inverted conical shape. The protrusion 353 is formed on the central upper end of the first grip strip 344.

The other end side of the clip body 341 is bifurcated by the provision of a slot whose width is increased as it goes to the distal end and then, rises radially, thereby serving as the second grip strip 345. The second grip strip 345 includes a coupling piece 354 laterally extending at the center thereof. A manipulating strip 348 rises radially from the middle thereof. Furthermore, the distal end side of the second grip strip 345 is bent substantially circularly, thereby serving as a pair of provisionally holding strips 349 having the shape of bifurcate hook. The distal end of each provisionally holding strip 349 is further bent obliquely upward to thereby serve as a hook claw 351. An engagement hole 352 is formed in the inner side of each hook claw 351. Guide edges 350 are provided on opposite edges of the hook claws 351 whose width is reduced toward the respective engagement holes 352.

Now, the manipulation for turning the above-described hose clip from the free state to the spread-diameter state will be described. The first and second grip strips 344, 345 are away from each other in the spread-diameter state of the clip body 341. In this condition, the jaws 361, 362 of the pliers 306 are applied to the distal end of the first grip strip 344 and the manipulation piece 348 of the second grip strip 345 respectively. The first and second grip strips 344, 345 are gripped with the pliers 306 so as to come close to each other. Then, the first grip strip 344 enters the engagement hole 352 of the second grip strip 345 and engaged with hook claws 351 of the provisionally holding strips 349, whereby the clip body 341 is held in the spread-diameter state. In this case, an angle at which the jaws of the pliers are applied to the respective grip strips is sometimes shifted or error in manufacture sometimes causes the first grip strip 344 to invade the engagement hole 352 in the condition that it is biased toward the provisionally holding strip 349. In such a case, however, since the first grip strip 344 is guided along the guide groove 350 of the hook claw 351, the first grip strip 344 can normally enter the engagement hole 352.

Then, the case where the clip body 341 is released from the spread-diameter state to clamp the hose connected to the pipe will be described with reference to FIG. 29. The hose is connected to the pipe or the like in the condition that the hose clip 304 in the spread-diameter state is previously inserted onto the hose. In this condition, one jaw 361 of the pliers 306 is applied to the underside of the provisionally holding strip 349 and the other jaw 362 is applied to the protrusion 353 of the first grip strip 344. When the pliers 306 are gripped tight, the first grip strip 344 is pushed downwardly to be thereby disengaged from the hook claws 351. The clip body 341 then returns to the free state by its inherent spring force, thereby clamping the hose. In this while, the jaws of the pliers are reliably applied to one of the provisionally holding strips 349 and the protrusion 353 respectively.

Accordingly, the releasing manipulation can be performed stably. Since the first grip strip 344 can be pushed down without an excessive force applied thereto, the clip body 301 can be prevented from being elastically deformed.

In case the hose is broken or needs to be replaced by a new one, the jaws of the pliers 306 are applied to the first and second grip strips 344, 345 respectively and are gripped so that the grip strips come close to each other. Consequently, the hose clip can again turn into the spread-diameter state. Thereafter, the hose clip is displaced to a suitable position and then, the hose is pulled out from the pipe. The hose clip is thus re-usable and the repair of the hose can be simplified.

Eighth Embodiment

Figure 30:
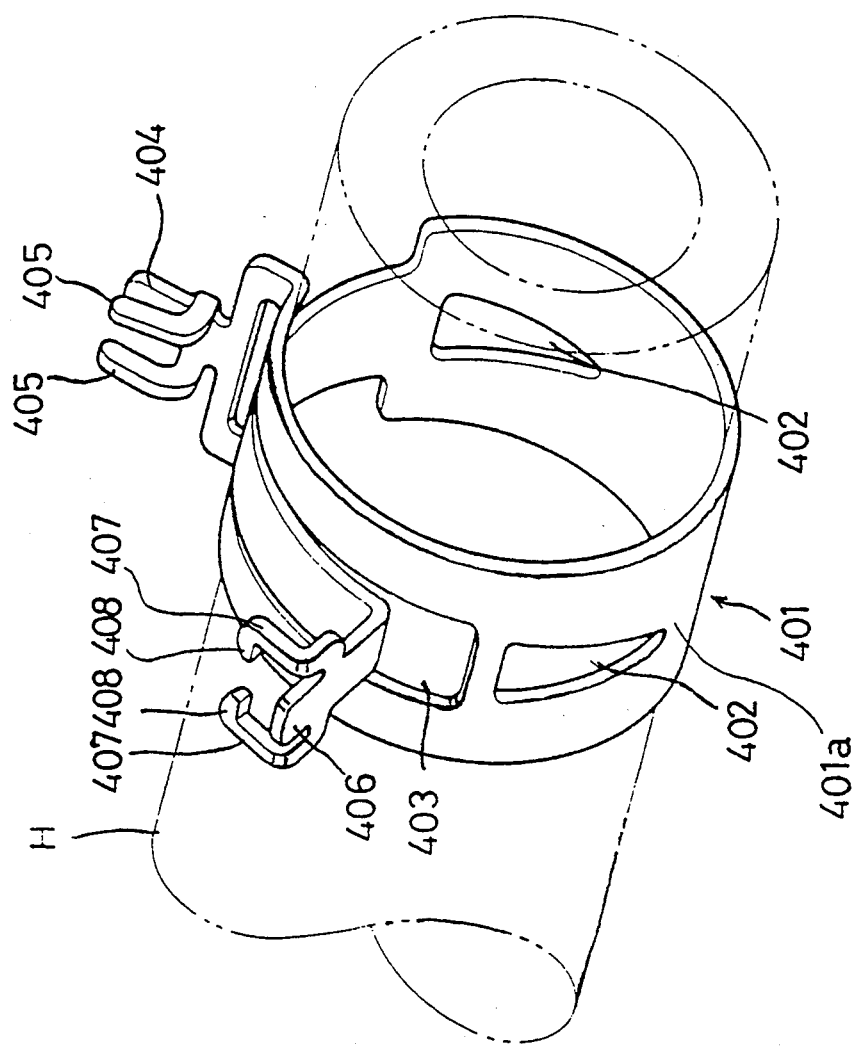
FIG. 30 is a perspective view of the hose clip of an eighth embodiment.
Figure 31:
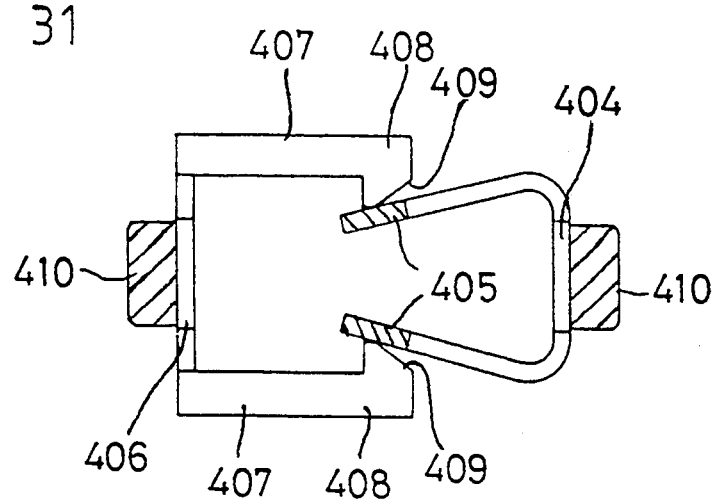
FIG. 31 is a partial sectional plan view of the hose clip being manipulated for its turn into the spread-diameter state.
Figure 32:
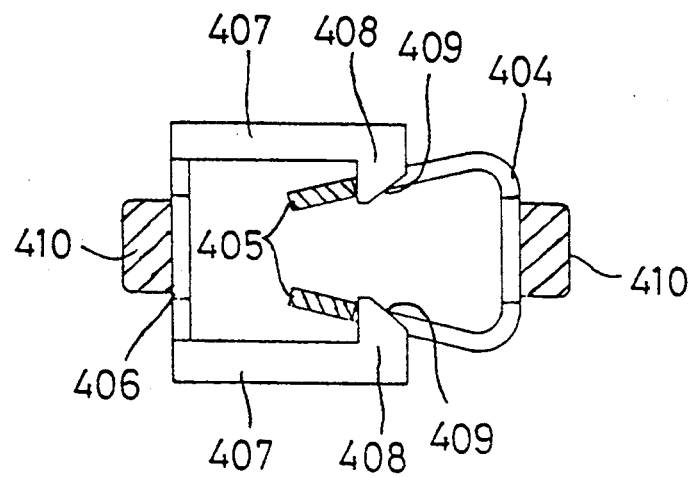
FIG. 32 is a partial sectional plan view of the hose clip in the spread-diameter state.
Figure 33:
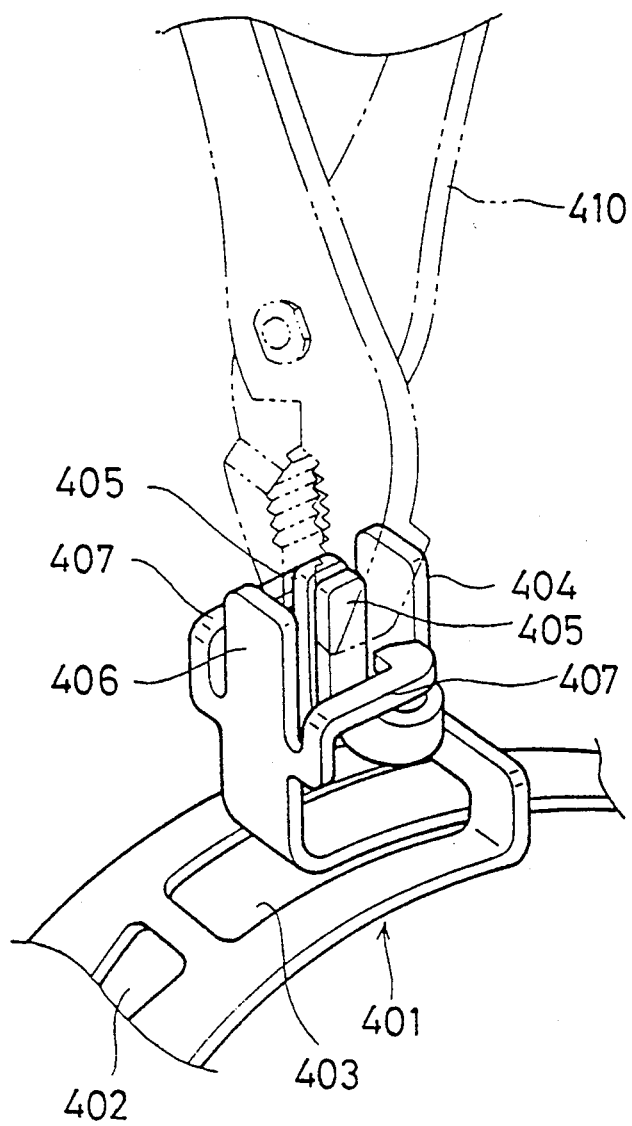
FIG. 33 is a partial perspective view of the hose clip in the releasing manipulation in the spread-diameter state.

FIGS. 30–33 illustrates the hose clip of an eighth embodiment. Referring to FIG. 30 showing an overall hose clip 401 in the spread-diameter state, the hose clip 401 comprises the clip body 401a formed by annularly bending the band leaf spring. Two triangular holes 402 are formed in the circumferential face of the clip body 401a so that a uniform clamping force is applied over the whole circumference of a hose H when it is clamped by the hose clip 401.

The groove 403 with a predetermined length is open in one end side of the clip body 401a. This end including a part of the groove 403 rises radially outwardly such that the first grip strip 404 is integrally projects axially from the central upper edge of the groove 403. The first grip strip 404 includes a pair of flexible strips 405 extending from the respective side edges thereof horizontally toward the second grip strip 406 as will be described later and in such respective directions that the distal ends come close to each other. The flexible strips 405 are further bent radially outwardly such that they rise to the height of the first grip strip 404. Each of the flexible strips 405 has a predetermined flexibility and is allowed to be flexible in the direction that each comes close to the other.

The clip body 401a has at the other end side a tapered or reduced width portion whose length is approximately the same as the opening of the groove 403. The distal end of the tapered portion extends through the first grip strip 404 with predetermined gaps between it and the respective side edges of the groove 403 and at approximately the same curvature as the groove 403. The distal end of the reduced width portion rises axially of the clip body 401a to thereby serve as the second grip strip 406 opposed to the first grip strip 404. Both grip strips 404, 406 are gripped with the commercially available tool 410 such as the pliers when the clip body 401a is to be turned from the free state to the spread-diameter state.

A pair of hook claws 407 are provided on the second grip strip 406 for disengageably holding the respective flexible strips 405. The hook claws 407 extend outwardly from side edges of the second grip strip 406 respectively and further extend generally horizontally toward the side of the first grip strip 404. The hook claws 407 have at the distal ends hooking portions 408 opposed to the flexible strips 405 with a predetermined space therebetween so that the hooking portions 408 are engageable with the flexible strips 405, respectively. Each hooking portion 408 has at the front edge an inwardly inclined guide edge 409 which guides the contraction of each flexible strip 405. A space between the hooking portions 408 is so set that the flexible strips 405 are allowed to pass through the space when they are gripped to be flexed.

The hose clip 401 constructed as described above is conveyed to a work place in its spread-diameter state. At the work place, the hose clip 401 in the spread-diameter state is inserted onto the end of the hose H, which is then fitted into the connection pipe (not shown). Both flexible strips 405 are gripped by the tool 410 so that the strips 405 are elastically deformed in the respective directions that they come close to each other. Consequently, the flexible strips 405 are disengaged from the hooking portions 408 respectively such that the flexible strips 405 are allowed to pass between the hook claws 407. The clip body 401a then turns to the reduced-diameter or free state by its inherent spring force, whereby the hose H can be automatically clamped by the hose clip 401.

When the hose H needs to be replaced by a new one, both grip strips 404, 406 are gripped with the tool 410 so that the grip strips 404, 406 come close to each other and that the flexible strips 405 are pushed into the opening between the hook claws 407. Upon further gripping, the flexible strips 405 are contracted, guided by the guide edges 409 of the hook claws 407 respectively such that the flexible strips 405 are guided to the inside of the hook claws 407. Consequently, the hooking portions 408 of the respective hook claws 407 are re-engaged with the respective flexible strips 405, whereby the clip body 401a is held in the spread-diameter state. Thus, the hose clip 401 can be quickly inserted onto the new hose H.

According to the eighth embodiment, the only manipulation for turning the hose clip between the spread-diameter state and the free state is to gripping the flexible strips 405 with the tool. Since this manipulation is a one-way manipulation, the working efficiency of the repair and replacement of the hose H can be improved. Furthermore, both ends of the hose clip are not deformed radially during the manipulations for its release from and hold in the spread-diameter state. Consequently, the circularity of the hose clip 401 can be preserved and accordingly, the hose clip 401 can be re-used without hindrance. Additionally, the above-described hose clip is advantageous particularly when a sufficient space cannot be ensured around the hose clip in the installation.

Ninth Embodiment

Figure 34:
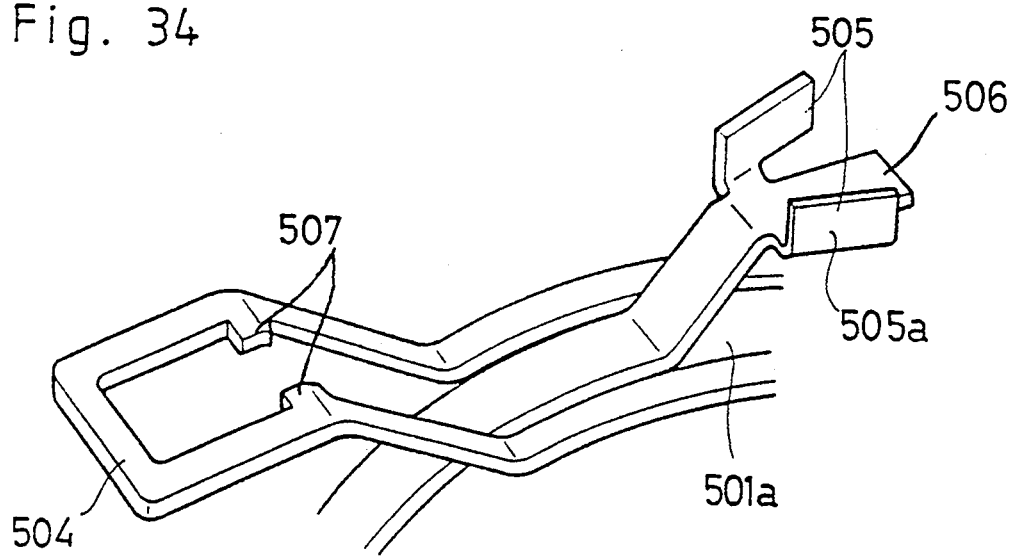
FIG. 34 is a partial perspective view of the hose clip of a ninth embodiment.
Figure 35:
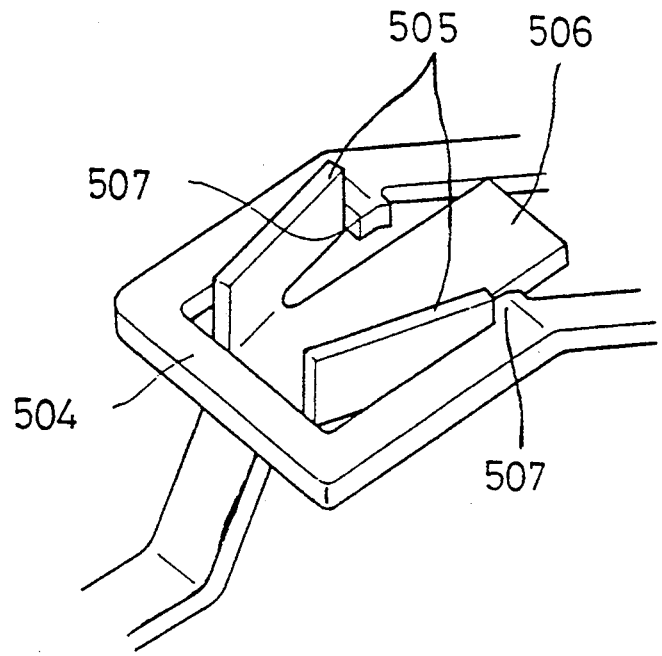
FIG. 35 is a partial perspective view of the hose clip in the spread-diameter state.

FIGS. 34 and 35 illustrate the hose clip of a ninth embodiment. In the ninth embodiment, the whole one end of the clip body 501a rises so that the first grip strip strip 504 is formed into the shape of an arch. The arch-shaped portion has on the inside edge the hook claws 507 projecting to be opposite to each other. The second grip strip strip 506 rising from the other end of the clip body 501a has a pair of flexible strips 505. The flexible strips 505 are connected at respective one ends to the side edges of the second grip strip strip 506 respectively and upwardly bent approximately perpendicularly. The flexible strips 505 extend outwardly so that the distance therebetween is increased toward their distal ends. Consequently, the flexible strips 505 are allowed to be flexed in the direction of contraction. More specifically, the side surface of each flexible strip 505 serves as a guide face 505a guiding the engagement of each flexible strip 505 with each corresponding hook claw 507. Furthermore, the space between root portions of the grip strips 504, 506 is so set as to be smaller than the space between the hook claws 507 while the space between the free ends of the grip strips are so set as to be larger than the space between the hook claws 507 such that the free end sides of the grip strips are engageable with the hook claws 507 and such that the flexible strips 505 are flexed to be allowed to pass between the hook claws 507 when the grip strips are gripped.

In the ninth embodiment, too, the hose clip can be turned between the spread-diameter state and the free state only by gripping the flexible strips 505 with the tool. The same effect can be achieved in the ninth embodiment as in the eighth embodiment.

The foregoing disclosure and drawings are merely illustrative of the principles of the present invention and are not to be interpreted in a limiting sense. The only limitation is to be determined from the scope of the appended claims.

We claim:
1. A hose clip comprising:
   a) a clip body comprising a leaf spring in the form of an annular band, the clip body having a main portion and two ends;
   b) the ends of the clip body being bent relative to said main portion so as to serve as grip strips, respectively;
   c) an engagement claw extending from one of the grip strips and engageable with the other of the grip strips to thereby hold the clip body in a spread-diameter state in which said ends of the clip body are close to each other, said engagement claw having a claw portion generally projecting in an axial direction of said annular band, said one of the grip strips having a side edge spaced in said axial direction from a push edge of said other of said grip strips such that when said side edge and said push edge are squeezed together to a predetermined extent axially of said annular band while the clip body is in said spread-diameter state, said engagement claw is disengaged from said other of the grip strips; and
   d) the engagement claw including a guide extending obliquely to said axial direction so as to guide said grip strips axially of said annular band of the clip body and thereby guide said engagement claw into engagement with said other of the grip strips when the grip strips are brought toward each other in the circumferential direction of said annular band.

2. A hose clip according to claim 1, wherein the claw portion of said engagement claw has a generally arcuate shape, and said guide is an arcuate surface of said claw portion.

3. A hose clip according to claim 1, wherein said engagement claw has the shape of an arrowhead so that said claw portion projects in both axial directions of said annular band of the clip body, and said other of the grip strips has engagement recesses in both sides thereof, respectively, so that the engagement claw is selectively received in either one of the engagement recesses when the hose clip is in said spread-apart state.

4. A hose clip according to claim 1, wherein said other of the grip strips has an engagement recess in which the engagement claw is received when said hose clip is in said spread-diameter state.

5. A hose clip according to claim 4, wherein said engagement claw has the shape of an arrowhead so that said claw portion projects in both axial directions of said annular band of the clip body, and said other of the grip strips has engagement recesses in both sides thereof, respectively, so that the engagement claw is selectively received in either one of the engagement recesses when the hose clip is in said spread-apart state.

6. A hose clip according to claim 1, wherein said engagement claw extends toward the other of said grip strips, and said guide comprises a side edge of the engagement claw.

7. A hose clip according to claim 6, wherein said engagement claw has the shape of an arrowhead so that said claw portion projects in both axial directions of said annular band of the clip body, and said other of the grip strips has engagement recesses in both sides thereof, respectively, so that the engagement claw is selectively received in either one of the engagement recesses when the hose clip is in said spread-apart state.

8. A hose clip according to claim 6, wherein said other of the grip strips has an engagement recess in which the engagement claw is received when said hose clip is in said spread-diameter state.

9. A hose clip according to claim 8, wherein said engagement claw has the shape of an arrowhead so that said claw portion projects in both axial directions of said annular band of the clip body, and said other of the grip strips has engagement recesses in both sides thereof, respectively, so that the engagement claw is selectively received in either one of the engagement recesses when the hose clip is in said spread-apart state.

* * * * *